Sept. 13, 1955
J. A. SHAFER
2,717,558
CAR TRUCK
Filed May 4, 1950
3 Sheets-Sheet 1
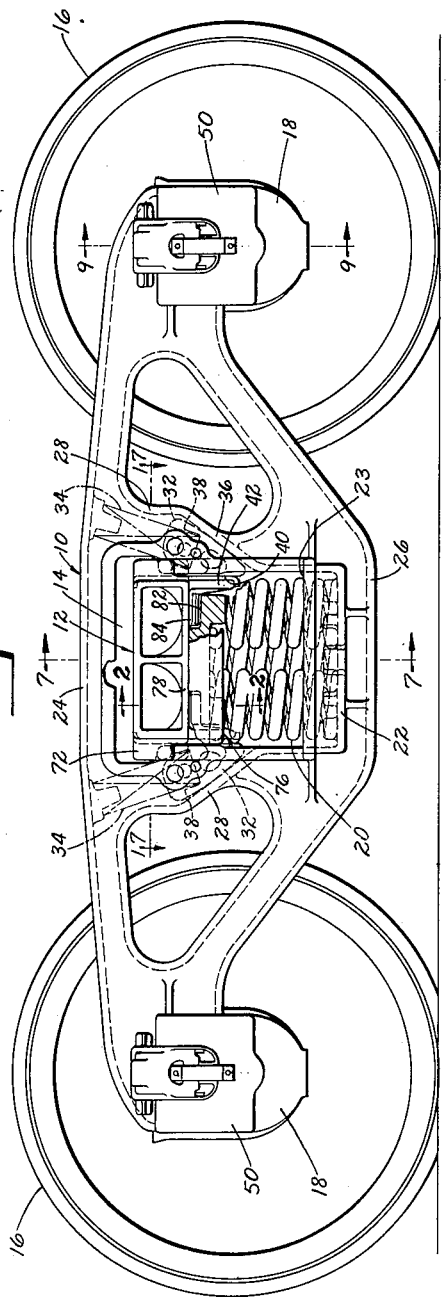
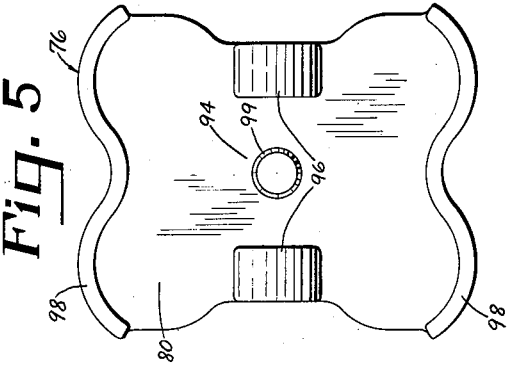
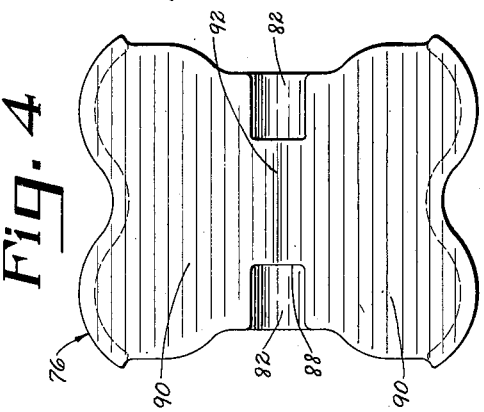
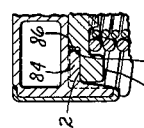
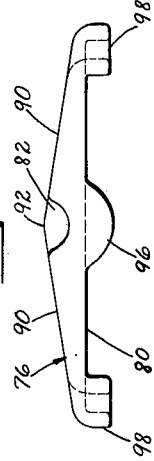
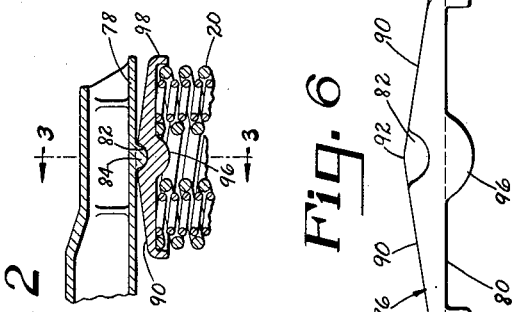
INVENTOR.
JAMES A. SHAFER
BY Albert E. Field
ATTORNEY Sept. 13, 1955 — J. A. SHAFER — 2,717,558
CAR TRUCK
Filed May 4, 1950 — 3 Sheets-Sheet 2

INVENTOR.
JAMES A. SHAFER
BY Albert E. Field
ATTORNEY

Sept. 13, 1955     J. A. SHAFER     2,717,558

CAR TRUCK

Filed May 4, 1950     3 Sheets-Sheet 3

INVENTOR.
JAMES A. SHAFER
BY Albert E. Field
ATTORNEY

United States Patent Office 2,717,558
Patented Sept. 13, 1955

2,717,558
CAR TRUCK

James A. Shafer, East Cleveland, Ohio, assignor to National Malleable and Steel Castings Company, Cleveland, Ohio, a corporation of Ohio Application May 4, 1950, Serial No. 159,887

8 Claims. (Cl. 105—187)

This invention relates to railway car trucks and more particularly to a car truck in which provision is made for controlled lateral movement of the bolster thereof.

The present invention concerns the provision in a railway car truck of a novel arrangement for obtaining lateral movement of the bolster in conjunction with a friction system for controlling the bolster movements.

In conventional car trucks, a very restricted amount of lateral movement of the bolster is possible by reason of the small clearance which exists between the stop lugs on the bolster and the adjacent side frames merely by virtue of the manufacturing tolerances for the bolster and side frame. With trucks of this construction any lateral movement of the bolster actually obtained is effected only through the transverse deflection of the bolster supporting springs.

In connection with my invention the bolster stop lugs are so disposed in relation to the side frames as to allow a substantial amount of lateral movement before the lugs engage the frames. Moreover, in order to attain the lateral movement permitted by the bolster stop lugs without the necessity of severe transverse deflection or distortion of the bolster supporting springs, my invention allows both side frames of the car truck to swing in the manner of a pendulum about the crowned top surface of the journal bearing wedges located in the journal boxes. This vertical swinging motion of the frames is made possible by a novel rocker plate which may be interposed either between the top of the bolster supporting springs and the under side of the bolster, or between the bottom of the springs and the spring seat on the side frame. The rocker plate assures that the surfaces against which the tops and bottoms of the springs engage will remain in parallel planes during lateral displacement of the bolster. Therefore all of the springs in the spring group will be compressed equally and thus will allow the frames to swing about the journal bearing wedges in response to lateral movement of the bolster. The frames are caused to swing by the lateral movement of the bolster which transmits a lateral force against the frames at the spring seats thereon by means of the rocker plate and the bolster supporting springs.

The control of the lateral movement of the bolster together with the pendulum action of the frames is obtained by means of the same friction generating means acting against the sides of the bolster that is employed to control the vertical movement of the bolster. Without this frictional damping of the pendulum action of the frames it is quite possible that in service the frames might get into a period of oscillation in which a highly objectionable to and fro movement of the bolster would result.

Accordingly, it is the main object of my invention to provide simple and efficient means for allowing a substantial amount of controlled lateral movement of the bolster of a car truck.

Another object is to provide a lateral motion truck in which the bolster movement is frictionally controlled and in which the bolster supporting springs are compressed equally as the bolster is displaced laterally.

A further object is to provide a car truck in which the side frames thereof are permitted to swing in pendulum manner about the crowned top surfaces of the journal bearing wedges located in the journal boxes in response to lateral movement of the bolster, with friction means for controlling the pendulum action of the side frames.

A more specific object is to provide a novel rocker plate for the bolster supporting springs of a car truck to obtain equal compression of the individual springs of the spring group during lateral displacement of the bolster relative to the side frame to enable the side frames to swing in pendulum manner about the crowned top surface of the journal bearing wedges.

Further objects and advantages of the invention will be apparent from the following description taken in conjunction with the drawings in which:

Fig. 1 is a side elevational view of a car truck embodying the invention, the rocker plate being partly broken away and shown in vertical section.

Fig. 2 is a vertical sectional view taken along line 2—2 of Fig. 1.

Fig. 3 is a vertical sectional view taken along line 3—3 of Fig. 2.

Fig. 4 is an enlarged top plan view of the rocker plate.

Fig. 5 is an enlarged bottom plan view of the rocker plate.

Fig. 6 is an enlarged side elevational view of the rocker plate.

Figure 7:
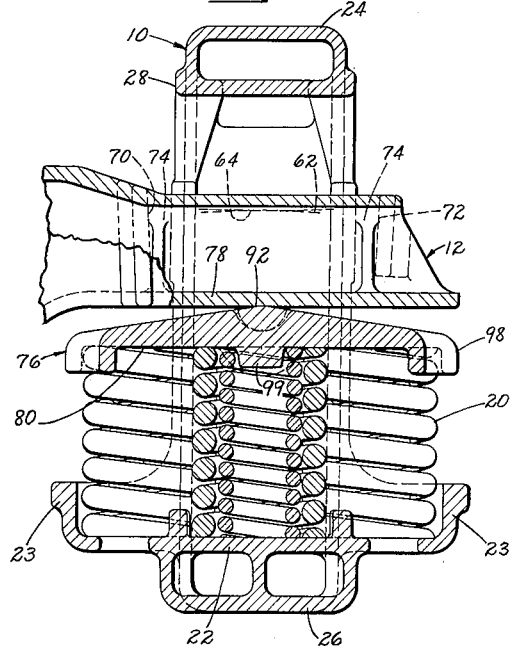
Fig. 7 is an enlarged vertical sectional view taken along line 7—7 of Fig. 1.

Referring to the drawings, there is shown a car truck having a side frame 10, a bolster 12 extending into a window opening 14 in the frame, and wheels 16 journalled within journal boxes 18. The bolster is supported by a group of coil springs 20 which, in the embodiment shown in Fig. 1, rest on the spring seat portion 22 of the side frame. In the truck illustrated, the group of springs 20 consists of a central spring, a pair of inboard springs and a pair of outboard springs. Upstanding spring retaining flanges 23 are provided at the edges of spring seat 22 on both the outboard and inboard sides of the side frame. Side frame 10 is of conventional construction and comprises compression member 24, tension member 26 and connecting columns 28 forming bolster receiving opening 14. The tension and compression members converge at the ends of the frame and merge with journal boxes 18. While only one side frame and the associated end of the bolster are shown in the drawings, it will be understood that the truck has an identical side frame associated with the opposite end of the bolster in like manner.

The friction system for controlling movements of the bolster is of the build-in type and is similar to that described and claimed in the United States applications of James A. Shafer, Serial No. 756,135, filed June 21, 1947 and Serial No. 128,153, filed November 18, 1949.

Each column 28 has a pocket 30 for accommodating a friction wedge 32 and a spring 34 which urges the wedge into engagement with the opposing side of the bolster. The pocket has a wall 36 sloping upwardly and away from the side of the bolster for engagement with the crowned surface 38 of the wedge. Vertical surface 40 on the wedge is flat and is in frictional contact with the side of the bolster. The bolster sides in the region of the friction wedges are extended downwardly by means of projections 42 to provide full surface engagement with the wedges during vertical movement of the bolster. The oscillations of bolster supporting springs 20 in service are effectively damped or controlled by the substantially constant frictional force exerted by wedges 32 against the sides of the bolster. It will be apparent that this frictional force will also serve to oppose movement of the bolster in a direction laterally of the car truck. This feature is utilized in connection with my invention to damp or control relative lateral movement between the bolster and side frames.

Figure 9:
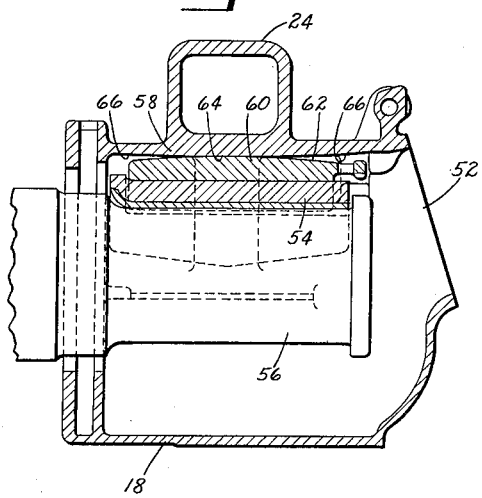
Fig. 9 is an enlarged vertical sectional view taken along line 9—9 of Fig. 1.

Referring particularly to Fig. 9 there is shown a sectional view through the journal box 18 which is of standard construction. The usual lid shown at 50 in Fig. 1 for closing front opening 52 has been omitted in Fig. 9. The conventional bearing or brass 54 is seated on journal 56, and interposed between the brass and top wall 58 of the box is the usual wedge 60 which has a convexly curved or crowned top surface 62. Wall 58 has a flat horizontally disposed surface 64 in contact with crowned surface 62. Adjacent surface 64, on either side thereof, wall 58 is sloped upwardly away from wedge 60 as at 66. The crowning of the top surface 62 is well known in the art and is primarily for the purpose of allowing for variations in track elevations which cause the truck axles to angle vertically with respect to the journal boxes. Thus, as an axle angles vertically relative to the side frames, the brass and wedge rock together on crowned surface 62, thereby assuring that the downward force transmitted by top wall 58 against the wedge will remain directed substantially at the midpoint of the latter.

In connection with my invention the crowned surface 62 of the journal bearing wedge is utilized to allow the side frame to swing in the manner of a pendulum relative to the wedge and axle at each end of the frame to make possible a substantial amount of lateral movement of the bolster, with the result that lateral shocks imparted to the bolster are effectively cushioned. In order to make possible a greater lateral displacement of the bolster relative to the side frames than has formerly been obtained, the inboard and outboard stop lugs 70 and 72 at the sides of the bolster have been so disposed as to allow a substantial lateral clearance as at 74 adjacent the side frame columns 28. Moreover, in order to obtain the pendulum action of the side frames, a rocker plate 76 (Figs. 1–8) in one form of the invention is interposed between the top surfaces of springs 20 and the bottom wall 78 of the bolster. Plate 76 permits relative angular movement between the bolster and the springs in a vertical direction, which is necessary in order to enable the frames to be swung or rocked on crowned surfaces 62 of journal bearing wedges 60. This action assures that all of springs 20 in the group which supports the bolster end will be compressed equally as the bolster moves laterally of the truck. Thus, as the frame is swung in response to lateral movement of the bolster, the plane of spring seat 22 and the plane of the underside 80 of rocker plate 76 remain parallel, as may be seen in Fig. 8. It will also be observed in Fig. 8 that the bolster remains horizontal during lateral movement thereof, while springs 20 and the side frame are tilted from the vertical.

The resistance of springs 20 to transverse deflection is utilized in obtaining the pendulum action of the side frame. As a lateral force is imparted by the bolster to rocker plate 76, it is transmitted down through the springs to seat 22 on the frame. Since the springs are quite resistant to transverse deflection or bending, the frame will be caused to swing about crowned surface 62 of the journal bearing wedges.

Rocker plate 76 is rockably mounted with respect to the bolster by means of a pair of fulcrum sockets 82 at the sides thereof for receiving the cylindrically curved fulcrum lugs 84 on the underside of the bolster. It will be observed that lugs 84 are so positioned that their axis lies in the longitudinal vertical center plane of the side frame when the latter is vertically disposed. Lugs 84 extend inwardly from projections 42 at each side of the bolster and terminate in end surfaces 86 which are adapted to engage the opposing walls 88 of sockets 82 to limit any shifting of the plate crosswise of the bolster. The plate is effectively tied to the bolster in a direction lengthwise thereof by the engagement between sockets 82 and lugs 84. The top surface 90 of the plate slopes upwardly from the outer edges thereof to form a fulcrum portion 92 which extends between sockets 82 and engages bottom wall 78 of the bolster. Thus the rocker plate is arranged to fulcrum about portion 92 as well as about lugs 84. This construction provides greater support for the plate and also permits a flat spring engaging seat 94 for the central spring of the group of bolster supporting springs 20. Arcuate protuberances 96 are provided beneath sockets 82 to strengthen the plate. The outer edges of the plate are curved to conform with the curvature of bolster supporting springs 20 and are provided with spring retaining flanges 98. In the region of bolster projections 42 the plate is made narrower so as to provide adequate clearance during rocking of the plate.

The bottom side of plate 76 is provided with a positioning lug 99 which extends into the central spring 20 of the group, thereby tying the upper end of this spring to plate 76 during lateral movement of the bolster.

Figure 8:
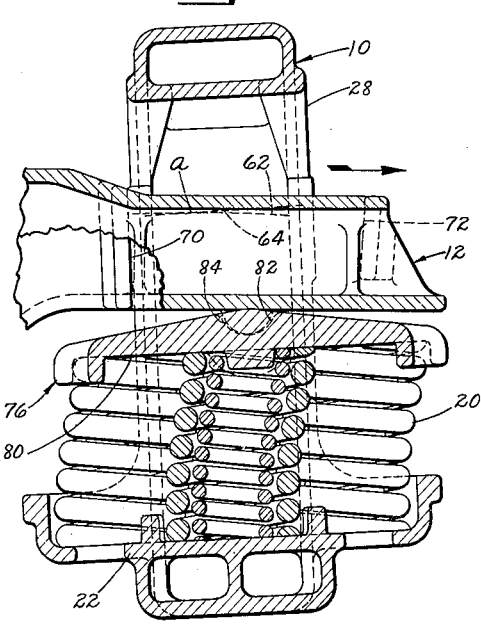
Fig. 8 is a view corresponding to Fig. 7 but showing the relative positions of the parts when the bolster is displaced laterally of the car truck.

In operation as a lateral force, which for the purpose of illustration has been shown as acting in the direction of the arrow in Fig. 8, is imparted to the bolster 12, it is transmitted by fulcrum lugs 82 to rocker plate 76 and hence to springs 20 through which it is directed to spring seat 22. The lower portion of side frame 10 then also moves in the direction of the arrow as the frame rocks about crowned surface 62 of journal bearing wedge 60. The lateral movement of the bolster relative to the frame as well as the swinging of the frame are frictionally resisted by wedges 32 acting against the sides of the bolster. This frictional control of the movement of the bolster and frame will effectively preclude the frame from getting into a period of oscillation about crowned surface 62 as would result in objectionable to and fro action of the bolster. As the bolster moves laterally, springs 20 will deflect or bend transversely a certain amount as may be seen in Fig. 8. Thus the total lateral travel of the bolster is equal to the transverse deflection of the springs plus the amount of movement permitted by the swing of the frame.

It will be understood that the resistance to lateral displacement of the bolster is provided by the frictional engagement between wedges 32 and the sides of the bolster and by force necessary to swing the side frame about crowned surface 62 of wedge 60. As the frame rocks about surface 62 the point of contact between the frame at top wall 58 and surface 62 moves laterally in the direction opposite to that of the bolster, or to the left as viewed in Fig. 8. The point "a" indicates the engagement between the wedge and the frame in this view. Accordingly, the force required to swing the frame increases rapidly as the frame swings away from the vertical. Conversely, the reacting force which is directed through springs 20 to the bolster serves to oppose lateral movement of the bolster as well as to return the frame to vertical position after the lateral force applied to the bolster ceases to act. While the springs deflect a certain amount transversely as the side frame swings in response to lateral movement of the bolster, the result is that the bolster moves laterally relative to the side frame an amount greater than would otherwise be possible.

Lateral movement of the bolster and the pendulum action of the frame are limited by the engagement of stop lugs 70 or 72, with columns 28, depending upon which direction the movement occurs. In Fig. 8 the movement has been limited by the engagement of inboard lugs 70 with the columns 28. It will be clear that at the other side of the truck the outboard lugs 72 will be in engagement with columns 28. It will be noted that lugs 70 and 72 are tilted slightly from the vertical so that a full surface contact occurs between the lugs and the columns when the bolster moves the full extent of lateral travel permitted.

A feature of the fulcruming of plate 76 with respect to the bolster during lateral movement of the latter is that the spring engaging surface 80 of the plate remains parallel to spring seat 22 on the side frame. This fact makes possible the pendulum action of the side frame, since springs 20 will be compressed equally as the bolster moves laterally.

Without plate 76 and with the upper ends of springs 20 in contact with the bolster and with the lower ends of the springs engaging spring seat 22, it is apparent that the spring seat would not remain parallel to bottom wall 78 of the bolster as the latter moved laterally, resulting in unequal compression of the springs. Thus, if in Fig. 8 it is considered that plate 76 has been removed, the springs on the right would be compressed from their original height before lateral movement of the bolster occurred, while the springs on the left would be expanded. This unbalance in the compression of the springs would make it virtually impossible for the side frame to be swung about crowned surface 62 of wedge 60. Consequently the side frame would remain substantially vertical and lateral movement of the bolster could occur only through transverse deflection of the springs. The amount of lateral movement obtained only through transverse deflection of the bolster supporting springs is inadequate to the attainment of proper cushioning of the bolster in that direction.

Figure 10:
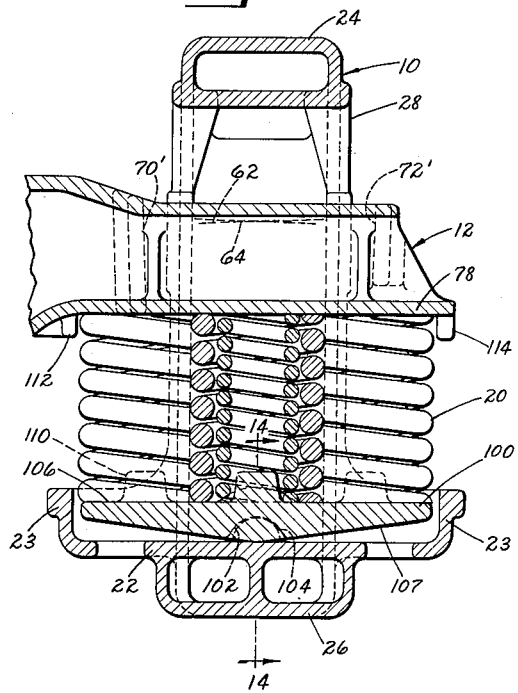
Fig. 10 is a view corresponding to Fig. 7 but showing a modified form of the invention.

In Fig. 10 is shown a modified form of the invention in which a rocker plate 100 is interposed between the bottom of springs 20 and spring seat 22 on the side frame. The upper ends of springs 20 are directly in engagement with bottom wall 78 of the bolster. Plate 100 is similar in construction to plate 76 of the previous embodiment and comprises a pair of spaced fulcrum sockets 102 for receiving fulcrum lugs 104 which are integral with spring seat 22 of the side frame and are disposed on the longitudinal center line of the latter. Sockets 102 and lugs 104 serve also to interlock or tie the plate to the side frame. Cylindrically curved protuberances 105 are provided on the upper side 106 of the plate opposite sockets 102 to strengthen the plate. The underside of plate 100 is sloped upwardly as at 107, forming a fulcrum 108 extending between sockets 102, about which the plate rocks as it fulcrums about lugs 104. Thus the rocker plate 100 is adapted to fulcrum with respect to spring seat 22 in the same manner as rocker plate 76 of the previous embodiment fulcrums with respect to the bottom wall of the bolster.

Positioning lugs 110 are provided on the plate for positioning springs 20 and for tying the lower ends thereof to the plate. The upper ends of springs 20 are tied to the bolster for movement therewith in a lateral direction by means of depending lugs 112 adjacent the inboard springs and lugs 114 adjacent the outboard springs.

Figure 11:
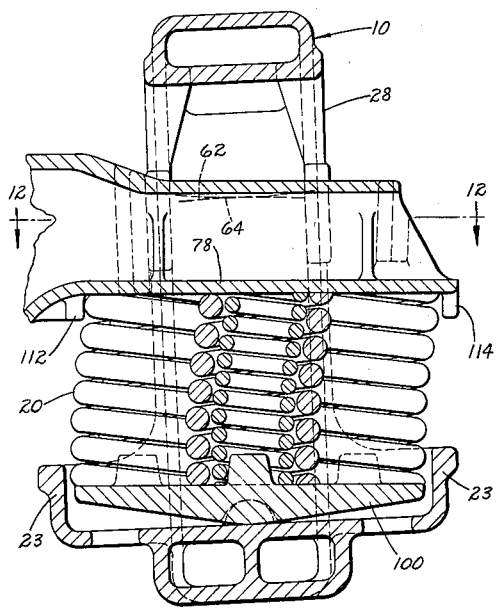
Fig. 11 is a view corresponding to Fig. 10 but showing the relative positions of the parts when the bolster is displaced laterally of the truck.
Figure 12:
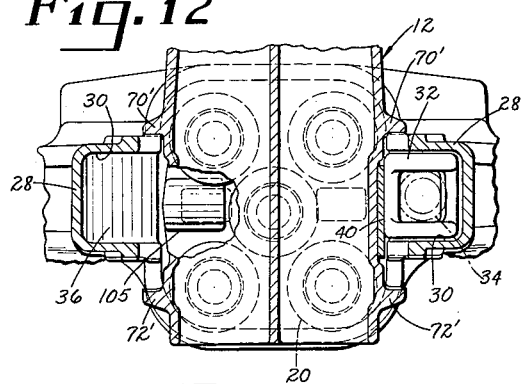
Fig. 12 is a horizontal sectional view taken along line 12—12 of Fig. 11, and shown at reduced scale.
Figure 13:
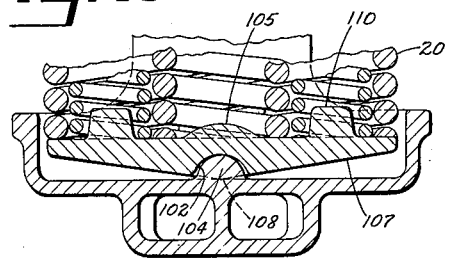
Fig. 13 is a fragmentary vertical sectional view taken along line 13—13 of Fig. 14.
Figure 14:
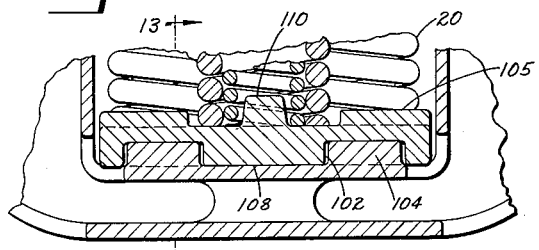
Fig 14 is a fragmentary vertical sectional view taken along line 14—14 of Fig. 10.
Figure 15:
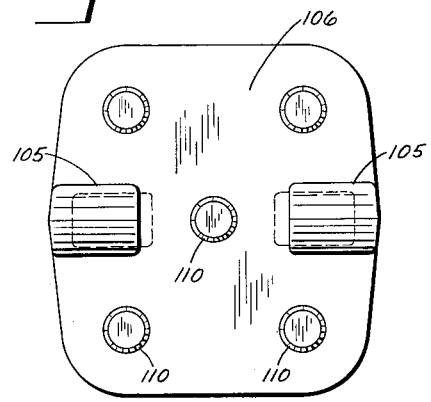
Fig. 15 is a top plan view of the modified rocker plate.
Figure 17:
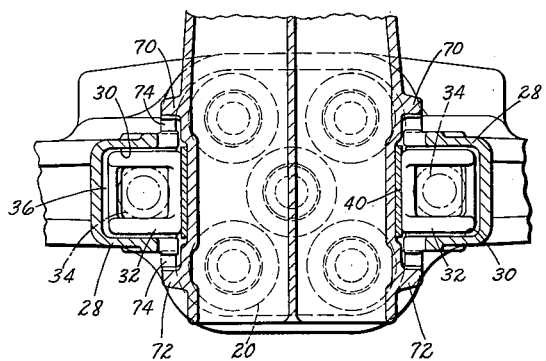
Fig. 17 is a horizontal sectional view taken along line 17—17 of Fig. 1.
Figure 16:
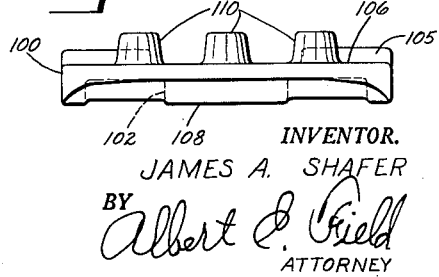
Fig. 16 is an end view of the modified rocker plate.

The operation of the modified form of the invention is as follows: As a lateral force is applied to the bolster it is transmitted down through springs 20 to rocker plate 100 and hence to spring seat 22 of the side frame, causing the latter to rock about crowned surface 62 of journal bearing wedge 60. As the side frame rocks in response to the lateral movement of the bolster, the rocker plate fulcrums about lugs 104 so that the spring supporting surface 106 remains parallel to bottom wall 78 of the bolster, resulting in equal compression of all of springs 20. Also, relative movement of the bolster and side frame is frictionally resisted by the action of friction wedges 32 against the sides of the bolster. Springs 20 will be deflected transversely as the bolster moves laterally and the side frame is rocked, as indicated in Figs. 11 and 12, in which further movement has been stopped through the engagement of stop lugs 70' with the side frame columns 28. As in the previous embodiment bolster stop lugs 70' and 72' are tilted with respect to the vertical so that full surface engagement will be obtained with the sides of columns 28. Lugs 70' and 72' are so spaced in relation to sides of columns 28 as to allow a substantial amount of bolster lateral movement to assure effective cushioning of the lateral forces imparted thereto. It will be noted that the bolster remains horizontal at all times as it moves laterally, so that springs 20 are compressed between horizontal surfaces throughout this movement.

As in the previous embodiment the total amount of lateral movement of the bolster obtained is that provided by the transverse deflection of the springs and by the swing of the side frame. In the form of the invention shown in Figs. 10, and 11–16, a greater amount of lateral movement of the bolster is obtained for a given amount of swing of the side frame than in the previous embodiment. This is due to the fact that the springs rock relative to the frame in the modification, whereas in the previous form the springs rock relative to the bolster. Thus the frictional resistance at the sides of the bolster will act through a greater distance in the modification for a given amount of swing of the frame.

The resistance to lateral displacement of the bolster in the modified form of the invention is provided as before by the frictional engagement between wedges 32 and the sides of the bolster and by the opposition of the side frame to tilting away from the vertical about crowned surface 62 of wedge 60. Also the restoring force set up by the tilting of the frame in response to lateral movement of the bolster serves to return the frame to vertical position after the force which urged the bolster laterally ceases to act.

While my invention has been shown in connection with a car truck in which the journal box construction has A. A. R. standard bearings and wedges, it is adapted equally well for use in conjunction with a car truck having roller bearing journal boxes. The invention is of especial usefulness where the roller bearing construction provides very little if any lateral movement in the bearing so that lateral forces imparted to the bolster must be cushioned through relative movement between the bolster and the side frame.

The terms and expressions which I have employed are used in a descriptive and not a limiting sense, and I have no intention of excluding such equivalents of the invention described, or of portions thereof, as fall within the purview of the claims.

What I claim is:

1. A railway car truck comprising a side frame member having integral journal boxes at the ends thereof, journals extending into said boxes, means in said boxes for rockably supporting said frame member on said journals in a direction laterally of said truck, a bolster member movable laterally of said frame member, a coil spring group for supporting said bolster member on said frame member, rocker means for enabling tilting of said spring group relative to one of said members so as to maintain equal compression of all the springs of said group to permit rocking movement of said frame member relative to said journals upon lateral movement of said bolster member, said rocker means being interposed directly between said spring group and one of said members, said rocker means being adapted to fulcrum about an axis so positioned on said one of said members as to lie in the longitudinal central plane of said frame member when the latter is in vertical position, stop means on said bolster member adapted for engagement with said frame member to limit lateral movement of said bolster member, said stop means being so positioned as to allow a substantial amount of lateral movement of said bolster member, and friction means for resisting lateral movement of said bolster member relative to said frame.

2. A railway car truck comprising a side frame mounted for swinging movement in a lateral direction relative to the truck axles, said frame having a bolster receiving opening and a spring seat therebelow, fulcrum means integral with said seat disposed on the longitudinal center line of said frame, a rocker member directly fulcrumed on said means, spring means on said rocker member, a bolster extending into said opening and supported on said springs, said rocker member being adapted to fulcrum on said fulcrum means in response to lateral movement of said bolster to maintain the spring-supporting surface of said member parallel to the spring-engaging surface of said bolster, friction means for resisting lateral movement of said bolster relative to said frame, and stop lugs on said bolster for engagement with said frame to limit lateral movement of said bolster, said lugs being so positioned on said bolster as to allow a predetermined amount of swinging movement of said frame upon lateral movement of said bolster.

3. In a railway car truck a side frame, journal boxes carried by said frame, journals extending into said boxes, means in said boxes for enabling swinging of said frame in a lateral direction relative to said journals, said frame having a bolster receiving opening and a spring seat therebelow, fulcrum means on said seat, a rocker member directly fulcrumed on said fulcrum means, said member having its fulcrum axis positioned on the longitudinal center line of said frame, spring means on said rocker member, a bolster extending into said opening and supported on said spring means, said rocker member being adapted to rock on said fulcrum axis upon lateral movement of said bolster to maintain the spring-supporting surface of said member parallel to the spring-engaging surface of said bolster, stop means on said bolster for engagement with said frame to limit lateral movement of said bolster, said stop means being so disposed as to allow a predetermined amount of swinging of said frame relative to said journals upon movement of said bolster laterally of said truck, and friction means for resisting lateral movement of said bolster.

4. In a railway car truck comprising a side frame member having integral journal boxes at the ends thereof, journals extending into said boxes, means in said boxes for enabling rocking movement of said frame member relative to said journals in a lateral direction, a bolster member, a coil spring group for supporting said bolster member on said frame member, and means for enabling a substantial amount of movement of said bolster member laterally of said frame member, said last named means comprising a rocker plate interposed between one of said members and said spring group, and fulcrum means on said one of said members on which said plate fulcrums, said fulcrum means being so positioned as to lie in the longitudinal central plane of said frame member when the latter is vertically disposed, said plate being interlocked with and adapted to rock relative to said member that is engaged by said plate to maintain the springs of said spring group under equal compression, said plate being tied to said spring group against movement laterally relative thereto, stop means at the sides of said bolster member adapted for engagement with said frame, said stop means being spaced laterally of the sides of said frame member a substantial amount when said frame member is vertically disposed, said frame member being adapted to be rocked upon lateral movement of said bolster member until said stop means are in engagement with said frame member, and friction means for resisting lateral movement of said bolster member relative to said frame member.

5. A railway car truck comprising a side frame mounted for tilting movement in a lateral direction relative to the truck axles, said frame having a bolster-receiving opening and a spring seat therebelow, upstanding flanges on the edges of said seat, fulcrum means integral with said seat disposed on the longitudinal center line of said frame, a rocker member disposed within the confines of said flanges and fulcrumed directly on said fulcrum means, spring means on said rocker member, a bolster extending into said opening and supported on said spring means, said side frame being adapted to swing relative to the truck axles in response to lateral movement of said bolster, said rocker member being adapted to fulcrum about said fulcrum means during lateral movement of said bolster to maintain the spring-supporting surface of said member parallel to the spring-engaging surface of said bolster, stop lugs on said bolster for engagement with said frame to limit lateral movement of said bolster, said lugs being so positioned on said bolster as to allow a predetermined amount of lateral tilting of said frame upon lateral movement of said bolster, and friction means for resisting lateral movement of said bolster relative to said frame.

6. A car truck as defined in claim 1 wherein said rocker means is interposed directly between said bolster and said spring group.

7. A car truck as defined in claim 1 wherein fulcrum lugs are provided on the underside of said bolster and said rocker means has fulcrum sockets receiving said fulcrum lugs.

8. A car truck as defined in claim 7 wherein said rocker means is formed with a fulcrum portion in line with and extending between said sockets and engaging the underside of said bolster.

References Cited in the file of this patent

UNITED STATES PATENTS

| Number | Name | Date |
|---|---|---|
| 309,657 | Shedlock | Dec. 23, 1884 |
| 706,585 | Murray | Aug. 12, 1902 |
| 895,157 | Bush | Aug. 4, 1908 |
| 929,300 | Goodspeed | July 27, 1909 |
| 1,277,802 | Wine | Sept. 3, 1918 |
| 1,414,957 | Kadel | May 2, 1922 |
| 1,637,928 | Bush | Aug. 2, 1927 |
| 1,679,811 | Bush | Aug. 7, 1928 |
| 1,779,526 | Barrows | Oct. 28, 1930 |
| 1,941,159 | Tatum | Dec. 26, 1933 |
| 2,021,167 | Blunt | Nov. 19, 1935 |
| 2,066,602 | Barrows et al. | Jan. 5, 1937 |
| 2,406,199 | Clasen (No. 1) | Aug. 20, 1946 |
| 2,435,384 | Clasen (No. 2) | Feb. 3, 1948 |
| 2,497,460 | Leese | Feb. 14, 1950 |